United States Patent
Shen et al.

(10) Patent No.: US 11,208,589 B2
(45) Date of Patent: Dec. 28, 2021

(54) CONTROLLING METAL SULFIDE SCALE IN DRILLING OPERATIONS

(71) Applicant: Halliburton Energy Services, Inc., Houston, TX (US)

(72) Inventors: Dong Shen, The Woodlands, TX (US); Hong Sun, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 51 days.

(21) Appl. No.: 16/518,413

(22) Filed: Jul. 22, 2019

(65) Prior Publication Data

US 2021/0024810 A1    Jan. 28, 2021

(51) Int. Cl.
*C09K 8/532* (2006.01)
*C09K 8/035* (2006.01)

(52) U.S. Cl.
CPC .............. *C09K 8/532* (2013.01); *C09K 8/035* (2013.01)

(58) Field of Classification Search
CPC ........... C09K 8/035; C09K 8/52; C09K 8/532
See application file for complete search history.

(56) References Cited

U.S. PATENT DOCUMENTS

| 4,563,292 A | 1/1986 | Borchardt |
| 2005/0067164 A1 | 3/2005 | Ke et al. |
| 2009/0143252 A1 | 6/2009 | Lehmann et al. |
| 2015/0080275 A1 | 3/2015 | Todd et al. |
| 2016/0333251 A1* | 11/2016 | Hurtevent .............. C09K 8/532 |

FOREIGN PATENT DOCUMENTS

WO    2016105385    6/2016

OTHER PUBLICATIONS

Bhandari et al., "Iron Sulfide Scale Control: A Novel Chemical for Growth Inhibition and Dispersion", SPE-179872-MS, Society of Petroleum Engineers, May 2016, 9 pages.

* cited by examiner

*Primary Examiner* — Frances Tischler
(74) *Attorney, Agent, or Firm* — Kilpatrick Townsend & Stockton LLP

(57) ABSTRACT

Described herein are methods for controlling or limiting the deposition of inorganic sulfide scale in wellbore operations. In some cases, method can include introducing a treatment fluid including a cationic polymeric quaternary amine or a polyethyleneimine polymer into a treatment area of a wellbore having metal cations, such as iron, zinc, and/or lead cations, and sulfide anions and contacting the metal cations and sulfide anions with the treatment fluid to reduce or prevent formation of metal sulfide particles in the treatment area. The polymers can include poly(methacrylamido-4,4,8,8-tetramethyl-4,8-diaza-6-hydroxylnonamethylene dichloride), poly(vinylbenzyl trimethyl ammonium chloride), polydimethyldiallyl ammonium chloride, or quaternized ammonium salt polyethyleneimine.

20 Claims, 5 Drawing Sheets

CONTROLLING METAL SULFIDE SCALE IN DRILLING OPERATIONS

FIELD

The present disclosure relates generally to methods for reducing the deposition of inorganic sulfide scale in wellbore operations. More specifically, but not by way of limitation, this disclosure relates to contacting an area with a treatment fluid to control or limit the deposition of metal sulfide scale within a wellbore and related production systems.

BACKGROUND

Plugging in a wellbore may slow or cease production from a well. In sour production systems, sulfide scales, especially iron sulfide (FeS) scale, may deposit and restrict production. Because of the low solubility of sulfide scale, even small amounts of dissolved iron and sulfide can cause production challenges from the scale formed. Production may be impacted by plugging of flow paths in the reservoir, perforations, and production tubulars by deposits of sulfide scale. FeS scale can accumulate on the downhole tubing and liner. This accumulation can restrict wellbore surveillance, limit downhole intervention, interfere with downhole logging, and damage logging tools.

Treatment fluids used in wellbore operations may include chemical additives to maintain, restore, or enhance the productivity of a well. Conventional chemical treatments for sulfide scale utilize acidic dissolvers that may produce hydrogen sulfide and pose health and safety risks to workers, damage production systems, and are not highly effective. Conventional mechanical treatments for sulfide scale may be costly, time intensive, and may not be highly effective.

DETAILED DESCRIPTION

Figure 1:
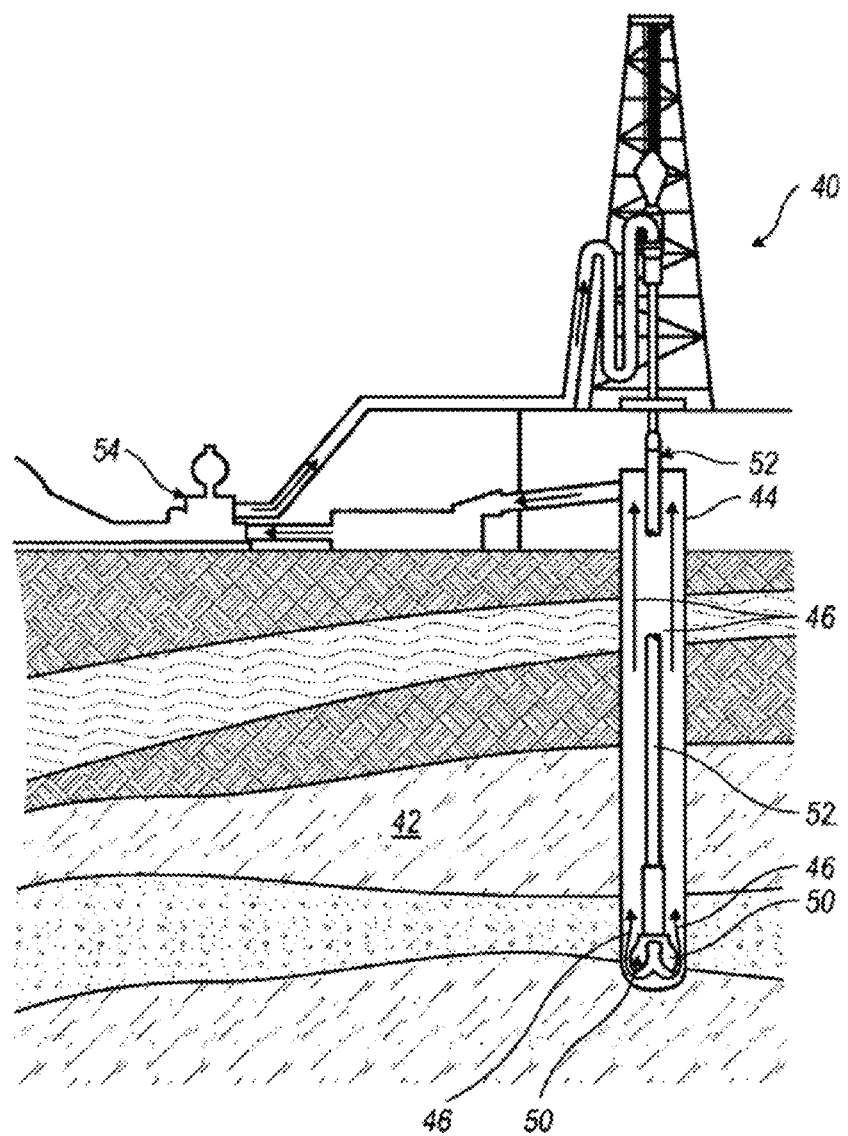
FIG. 1 is an illustrative schematic of a drilling assembly using a treatment fluid according to examples of the present disclosure.

Certain aspects and features of the present disclosure relate to methods of reducing or preventing sulfide scale formation in a wellbore or well production systems. Sulfide scale can plug or reduce production from oil and gas well systems. Sulfide scale is especially a concern in sour wells with high sulfur content. Conventional methods dissolve or remove the scale after deposition. Described herein are methods of contacting a wellbore or well production systems with a treatment fluid to reduce or prevent sulfide scale deposition in a wellbore or production systems having iron cations and sulfide anions and mitigating damage caused by sulfide scaling.

Iron cations and sulfide anions form iron sulfide (FeS), which precipitates and/or flocculates within the fluids used in wellbore production. The FeS can deposit onto surfaces and form a robust scale that restricts flow and lowers production of the wellbore. Other metal ions in the wellbore may combine with sulfide ions to form a precipitate, which can deposit on surfaces and restrict flow. For example, lead (Pb) and zinc (Zn) ions can form PbS and ZnS in the wellbore.

The methods described herein may include introducing a treatment fluid that includes a cationic polymeric quaternary amine into a treatment area of a wellbore having metal cations and sulfide anions and contacting the metal cations and sulfide anions with the treatment fluid to reduce or prevent formation of iron sulfide particles in the treatment area. The methods may include introducing a treatment fluid that includes a polyethyleneimine polymer into a treatment area having metal cations and sulfide anions. The treatment area may be a permeable subterranean formation. The treatment area may be wellbore production systems, such as downhole tubing and liner. Metal ions may include, but are not limited to, iron cations, lead cations, zinc cations.

Cationic polymeric quaternary amines exhibit strong interactions with dissolved iron and iron sulfide particles, and can inhibit formation of FeS or disperse FeS particles once formed. Cationic polymeric quaternary amines may adsorb FeS particles with negative surfaces charges and can prevent FeS particles from flocculating. In some examples, the cationic polymeric quaternary amine includes poly (methacrylamido-4,4,8,8-tetramethyl-4,8-diaza-6-hydroxyl-nonamethylene dichloride) (PMDTHD), poly(vinylbenzyl trimethyl ammonium chloride) (PVBTMAC), or polydimethyldiallyl ammonium chloride (PDADMAC).

PMDTHD has the structure below and can have an average molecular weight ranging from about 1000 Daltons to about 5,000,000 Daltons.

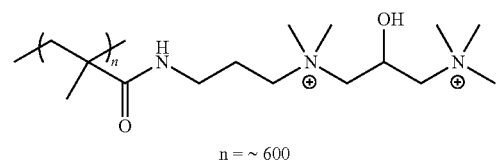

n = ~ 600

PVBTMAC has the structure below and can have an average molecular weight ranging from about 1000 Daltons to about 500,000 Daltons. PVBTMAC may be used as a homopolymer. In some examples, the average molecular weight of the homopolymer PVBTMAC may be about 400,000 Daltons.

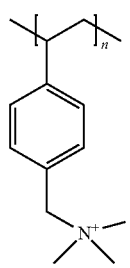

PDADMAC has the structure below and can have an average molecular weight ranging from about 1000 Daltons to about 500,000 Daltons. PDADMAC may be used as a homopolymer. In some examples, the average molecular weight of the homopolymer PDADMAC may be about 20,000 Daltons.

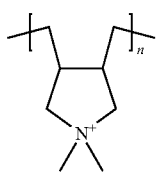

Polyethyleneimine (PEI) is not ionic, but includes nitrogen atoms that are nucleophilic and can interact strongly with iron ($Fe^{2+}$) ions, and can inhibit formation of FeS. In some examples, PEI is a chelating agent that can complex metal ions, such as Zn or Pb. PEI can be quaternized to form a polycationic polyammonium salt. PEI has the structure below and can have an average molecular weight ranging from about 1000 Daltons to about 5,000,000 Daltons. In some examples, the average molecular weight of PEI may be about 60,000 Daltons.

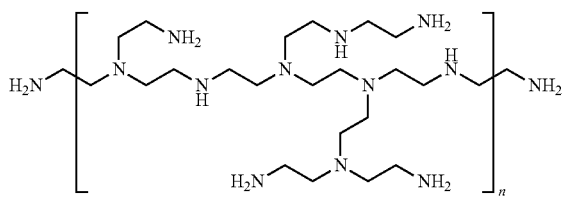

The treatment fluid may include up to 40 weight percent (wt. %) of PMDTHD, PVBTMAC, PDADMAC, or PEI. For example, the treatment fluid may include about 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. %, 21 wt. %, 22 wt. %, 23 wt. %, 24 wt. %, 25 wt. %, 26 wt. %, 27 wt. %, 28 wt. %, 29 wt. %, 30 wt. %, 31 wt. %, 32 wt. %, 33 wt. %, 34 wt. %, 35 wt. %, 36 wt. %, 37 wt. %, 38 wt. %, 39 wt. %, or 40 wt. % polymer or amine.

The treatment fluid may further include water or brine. In certain examples, the treatment includes at least 60 wt. % water or brine. For example, the treatment fluid may include about 60 wt. %, 61 wt. %, 62 wt. %, 63 wt. %, 64 wt. %, 65 wt. %, 66 wt. %, 67 wt. %, 68 wt. %, 69 wt. %, 70 wt. %, 71 wt. %, 72 wt. %, 73 wt. %, 74 wt. %, 75 wt. %, 76 wt. %, 77 wt. %, 78 wt. %, 79 wt. %, 80 wt. %, 81 wt. %, 82 wt. %, 83 wt. %, 84 wt. %, 85 wt. %, 86 wt. %, 87 wt. %, 88 wt. %, 89 wt. %, 90 wt. %, 91 wt. %, 92 wt. %, 93 wt. %, 94 wt. %, 95 wt. %, 96 wt. %, 97 wt. %, 98 wt. %, or 99 wt. % water or brine.

Turning to the figures, FIG. 1 illustrates a wellbore 44 being drilled through a subterranean formation 42. A drill rig 40 can be used for drilling the wellbore 44. A drill bit 50 may be mounted on the end of a drill string 52 that includes multiple sections of drill pipe. The wellbore 44 may be drilled by using a rotary drive at the surface to rotate the drill string 52 and to apply torque and force to cause the drill bit 50 to extend through wellbore 44. A drilling fluid may be displaced through the drill string 52 using one or more pumps 54. The drilling fluid may be circulated past the drill bit 50 and returned to the surface through the annulus of wellbore 44, as indicated by arrows 46, thereby removing drill cuttings (e.g., material such as rock generated by the drilling) from the wellbore 44. Although not shown, additional conduits besides drill string 52 may also be disposed within wellbore 44. As the drilling fluid contacts the formation 42, iron and sulfide ions may be released into the fluid and form a precipitate and flocculate.

The FeS precipitate may be deposited upon surfaces of the wellbore and production systems, and restrict flow. The deposition of scale may be increased in sour well systems that contain high levels of sulfur. In some cases, a treatment fluid is added to the wellbore or drilling fluid to prevent or reduce the formation of metal sulfide scaling or deposits in the wellbore and production systems, or other treatment areas.

The methods described herein may further include contacting the treatment fluid with a drilling fluid before introducing the treatment fluid into the treatment area. In some examples, the drilling fluid may include water, a brine, or a hydrocarbon fluid. The water may be fresh water, seawater, or salt water, for example. The hydrocarbon fluid may be mineral oils, biodegradable esters, olefins, or other variants.

The treatment fluid may be introduced to the treatment area at a concentration of polymer or amine ranging from about 0.0001 wt. % to about 30 wt. %. For example, the concentration of the treatment fluid introduced may be about 0.0001 wt. %, 0.0005 wt. %, 0.001 wt. %, 0.005 wt. %, 0.01 wt. %, 0.5 wt. %, 0.1 wt. %, 0.5 wt. %, 1.0 wt. %, 1.5 wt. %, 2 wt. %, 2.5 wt. %, 3 wt. %, 3.5 wt. %, 4 wt. %, 4.5 wt. %, 5 wt. %, 6 wt. %, 7 wt. %, 8 wt. %, 9 wt. %, 10 wt. %, 12 wt. %, 14 wt. %, 16 wt. %, 18 wt. %, 20 wt. %, 22 wt. %, 24 wt. %, 26 wt. %, 28 wt. %, or 30 wt. % polymer or amine. In certain examples, the treatment fluid is introduced to the treatment area at a concentration ranging from about 0.0001 wt. % to about 5 wt. % polymer or amine.

Optionally, the treatment fluid may be circulated in the treatment area. In some examples, a filtration unit may be included on the circulation loop.

In certain examples, the treatment fluid may be concentrated with polymer or amine to form a semi-solid or solid composition. The concentration of the polymer in the composition could be up to 95 wt. % of PMDTHD, PVBTMAC, PDADMAC, or PEI. Optionally, the composition could be added to a drilling fluid in a semi-solid or solid form.

In some cases, methods to reduce or prevent sulfide scale include contacting a drilling fluid with a first treatment fluid to form a second treatment fluid, and introducing the second treatment fluid into a wellbore. The treatment fluid can prevent or reduce formation of metal sulfide scaling deposit in the wellbore. The wellbore may include metal cations and sulfide anions. In some cases, the first treatment fluid includes a cationic polymeric quaternary amine. The cationic polymeric quaternary amine may have an average molecular weight of from about 1000 Daltons to about 500,000 Daltons. The cationic polymeric quaternary amine may have an average molecular weight of from about 1000 Daltons to about 5,000,000 Daltons. In some cases, the first treatment fluid includes a polyethyleneimine polymer. The polyethyleneimine polymer may have an average molecular weight of from about 1000 Daltons to about 500,000 Daltons. PEI may be quaternized to form a polycationic polyammonium salt. In certain examples, the concentration of the first treatment fluid in the second treatment fluid introduced to the wellbore is from about 0.0001 weight percent to about 5 weight percent. Optionally, the method may further include circulating the second treatment fluid in the wellbore.

In some examples, a treatment fluid comprises a cationic polymeric quaternary amine or a polyethyleneimine polymer and water or brine. The treatment fluid may be injectable into a wellbore comprising metal ions and sulfide anions. The metal ion may include, for example, iron cations, lead cations, zinc cations. The treatment fluid may contact iron cations and the sulfide anions to reduce or prevent formation of iron sulfide particles in the wellbore.

In certain examples, the treatment fluid includes up to 30 weight percent cationic polymeric quaternary amine or polyethyleneimine polymer. The cationic polymeric quaternary amine may include poly(methacrylamido-4,4,8,8-tetramethyl-4,8-diaza-6-hydroxylnonamethylene dichloride), poly(vinylbenzyl trimethyl ammonium chloride), or polydimethyldiallyl ammonium chloride. The cationic polymeric quaternary amine may have an average molecular weight of from 1000 Daltons to 5,000,000 Daltons. Optionally, the cationic polymeric quaternary amine has an average molecular weight of from 1000 Daltons to 500,000 Daltons.

EXAMPLE

Example 1

FeS Dispersion/Scaling Tests

A cationic scaling solution was prepared by dissolving 58.4 g NaCl and 7.33 g $CaCl_2.2H_2O$ into 1 liter of deionized water. The pH was adjusted to 4.3 by adding 2.4 mL of an aqueous acetic acid solution. The solution was sparged with high purity $N_2$ gas for 3 hours to remove dissolved oxygen. Once sparged, 20 ppm $Fe^{2+}$ and 30 ppm hydroxylamine hydrochloride, a reducing agent, were added and dissolved in the solution.

An anionic scaling solution was prepared by dissolving 58.4 g NaCl into 1 liter of deionized water. The pH was adjusted to 12 by adding 3.0 of aqueous NaOH to the solution. The solution was sparged with high purity $N_2$ gas for 3 hours to remove dissolved oxygen. Once sparged, 60 ppm $S^{2-}$ was added and dissolved in the solution.

A series of test samples were prepared with various concentrations of polymer (PMDTHD, PVBTMAC, PDADMAC, or PEI) ranging from 0 ppm to 800 ppm of the polymer. For each sample, the desired amount of PMDTHD, PVBTMAC, PDADMAC, or PEI was added to a 4 ounce glass container, followed with 50 mL of the cationic scaling solution, and 50 mL of the anionic scaling solution. Each container was then sealed tightly. Resultant mixtures were mixed for 15 seconds and then visually evaluated over a period of 8 hours. Observation of FeS scale flocculate or FeS settled on the bottom of the container indicated the formation of FeS scale deposit.

Figure 2A:
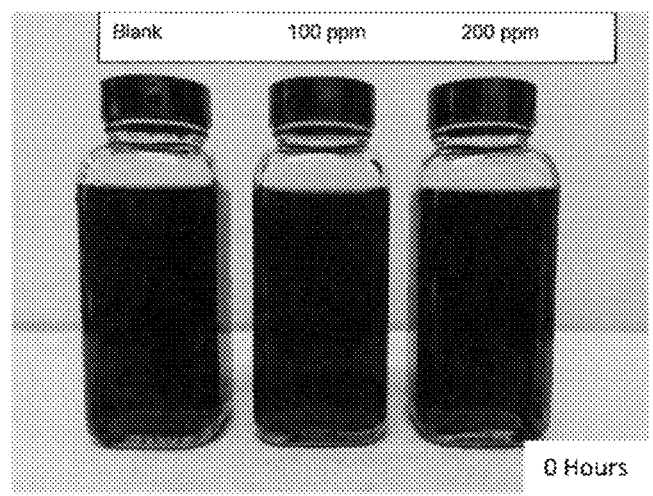
FIGS. 2A to 2C are side views of the FeS inhibition/dispersion test for PMDTHD at 0 hours, 4 hours, and 8 hours, respectively, according to one example of the present disclosure.
Figure 2B:
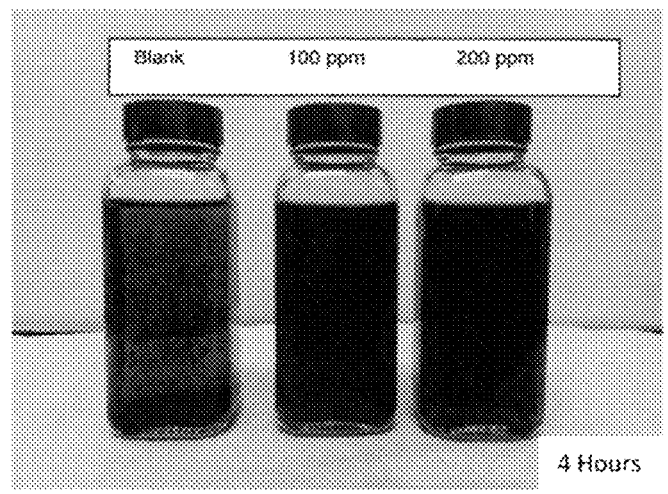

FeS formed immediately in samples having 0 ppm polymer (blank) and the FeS was initially well dispersed in the blank sample at time 0 hours, as shown in FIG. 2A. After 4 hours, the FeS particles in the blank aggregated together and began to settle on the bottom of the container, as shown in FIG. 2B. Once the FeS particles settled, the sample increased in transparency. After 8 hours, the FeS particles flocculated and had settled to the bottom of the container, further increasing transparency of the sample, as shown in FIG. 3A.

Figure 2C:
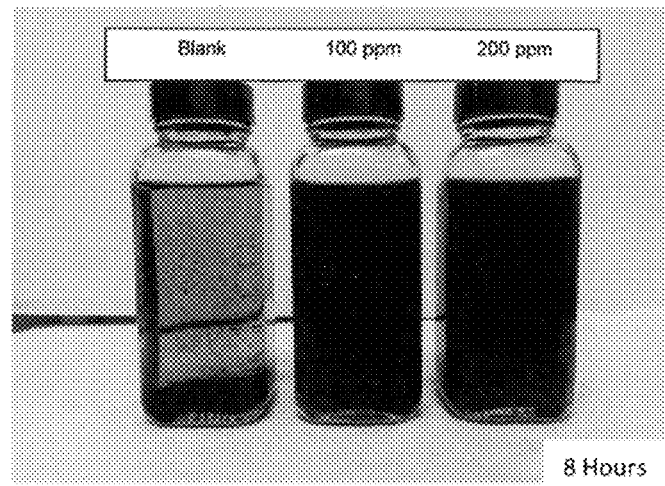

PMDTHD was tested at concentrations of 100 ppm and 200 ppm. At both concentrations, the FeS particles remained well dispersed in the fluid (opaque in appearance) at 4 hours and 8 hours after the initial mixing, as shown in FIGS. 2A to 2C.

Figure 3A:
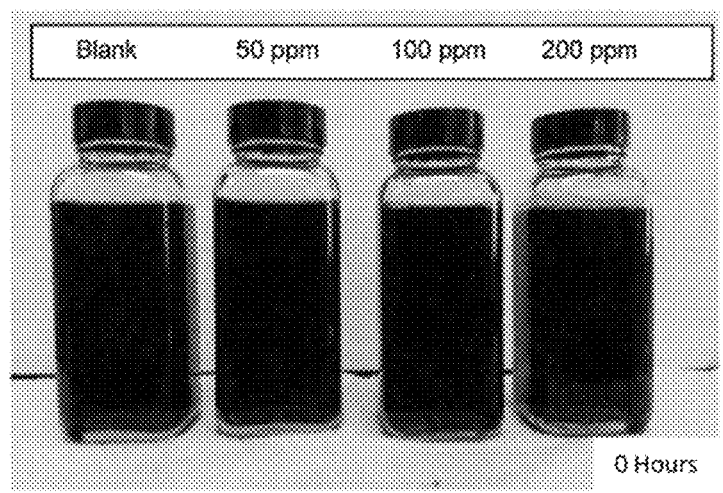
FIGS. 3A to 3C are side views of the FeS inhibition/dispersion test for PVBTMAC at 0 hours, 4 hours, and 8 hours, respectively, according to one example of the present disclosure.
Figure 3B:
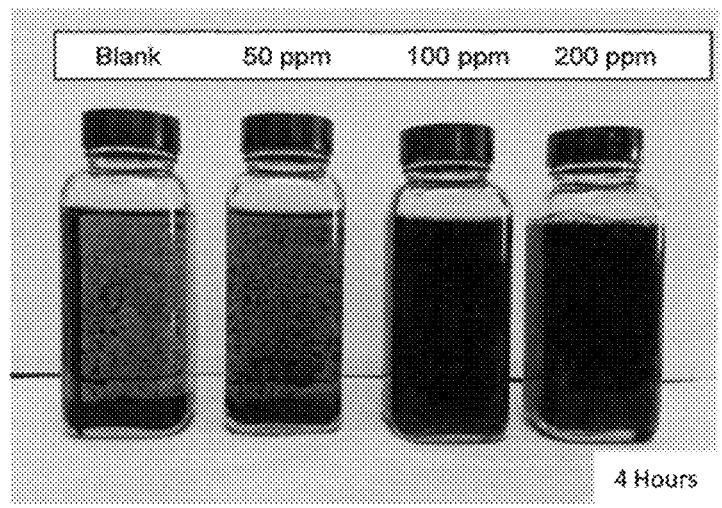
Figure 3C:
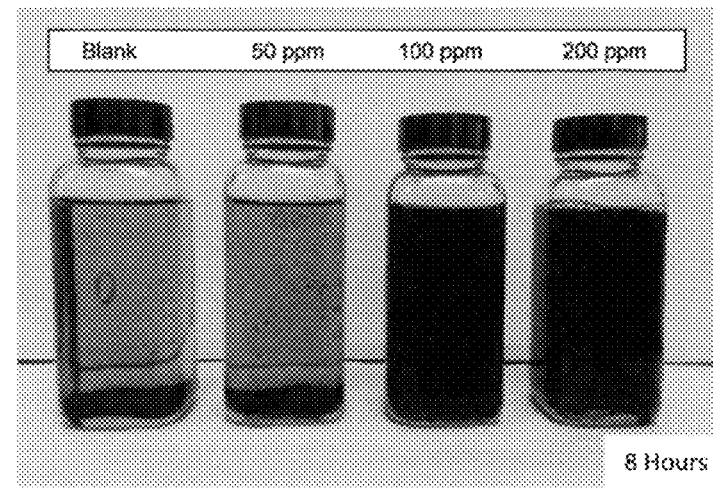

PVBTMAC was tested at concentrations of 50 ppm, 100 ppm, and 200 ppm, as shown in FIGS. 3A to 3C. At concentrations of 100 ppm and 200 ppm, the FeS particles remained well dispersed in the fluid (opaque in appearance) at 4 hours and 8 hours after the initial mixing. The 50 ppm sample exhibited some flocculation and settling of FeS after 4 hours, with most of the FeS settled after 8 hours.

Figure 4A:
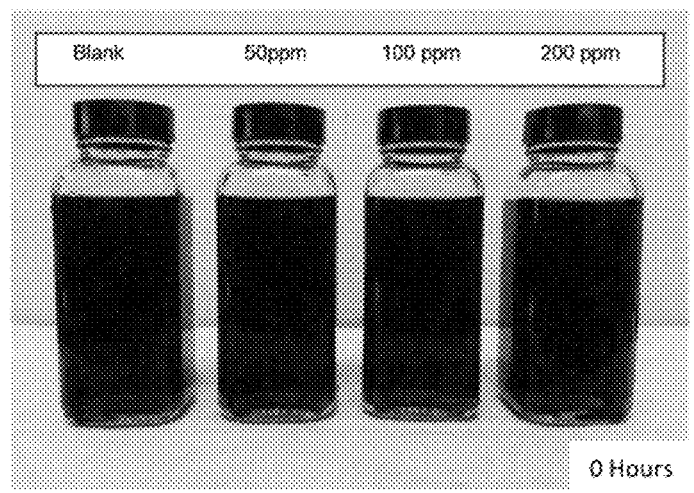
FIGS. 4A to 4C are side views of the FeS inhibition/dispersion tests for PDADMAC at 0 hours, 4 hours, and 8 hours, respectively, according to one example of the present disclosure.
Figure 4B:
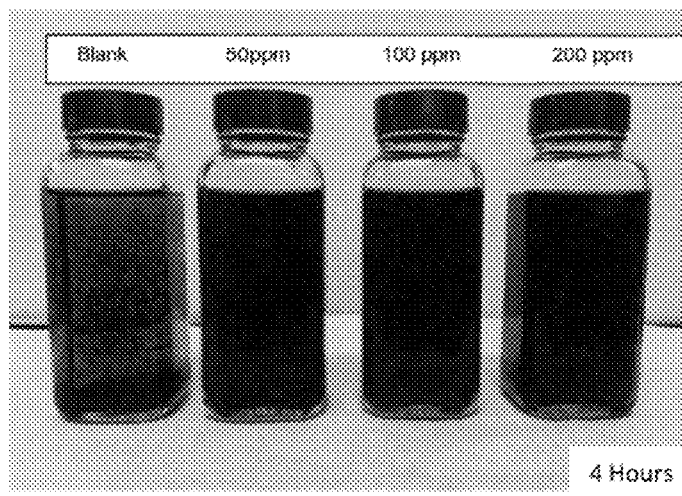
Figure 4C:
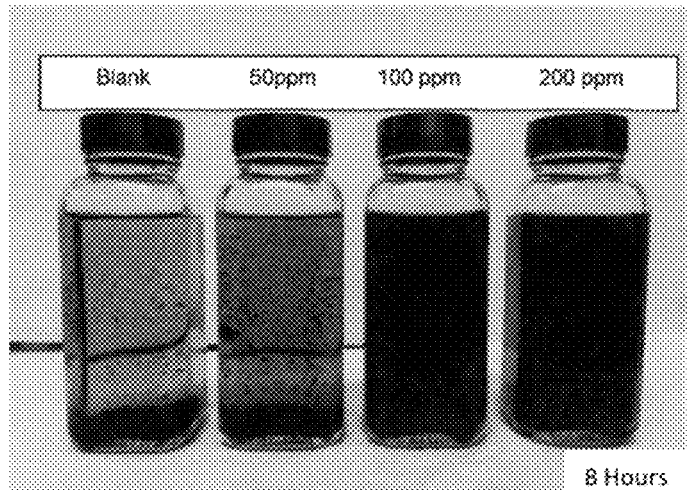

PDADMAC was tested at concentrations of 50 ppm, 100 ppm, and 200 ppm, as shown in FIGS. 4A to 4C. At concentrations of 100 ppm and 200 ppm, the FeS particles remained well dispersed in the fluid (opaque in appearance) at 4 hours and 8 hours after the initial mixing. The 50 ppm sample remained well dispersed after 4 hours, but exhibited some flocculation and settling of FeS after 8 hours.

Figure 5A:
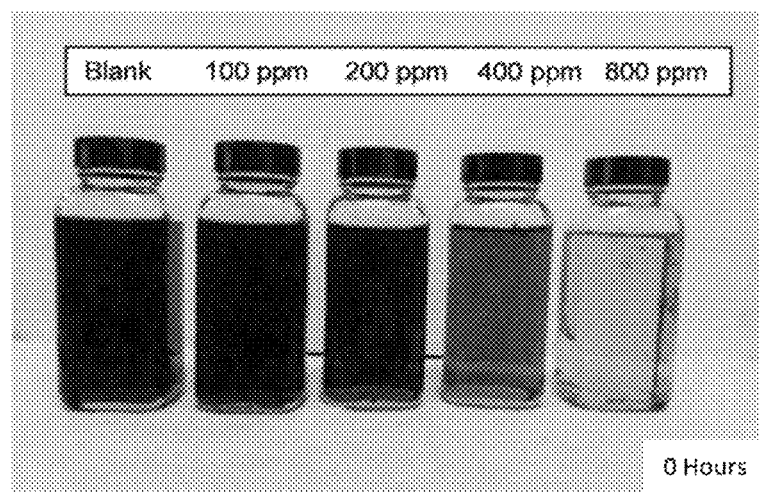
FIGS. 5A to 5C are side views of the FeS inhibition/dispersion test for PEI at 0 hours, 4 hours, and 8 hours, respectively, according to one example of the present disclosure.
Figure 5B:
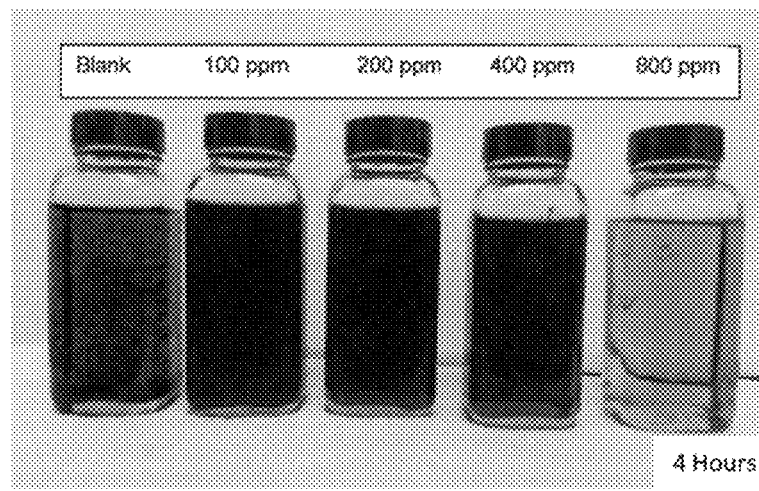
Figure 5C:
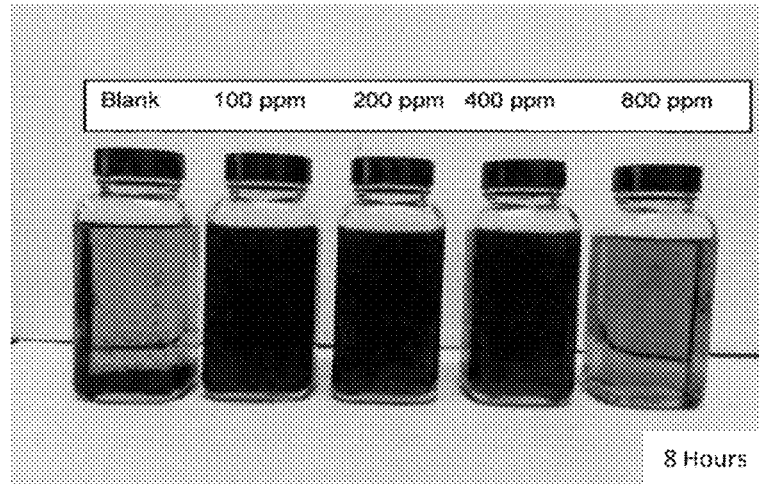

PEI was tested at concentrations of 100 ppm, 200 ppm, 400 ppm, and 800 ppm, as shown in FIGS. 5A to 5C. At 0 hours, no FeS particles were observed in the 800 ppm sample (transparent with no precipitate), and the 400 ppm sample showed some FeS particles. The 100 ppm and 200 ppm samples were similar in transparency to the blank. At 4 hours and 8 hours, the FeS particles remained well dispersed in the PEI samples at 100 ppm and 200 ppm, and the small amount of FeS formed in the 400 ppm sample remained well dispersed. No FeS particles were observed in the 800 ppm PEI sample.

Illustrative Embodiments of Suitable Materials and Methods.

As used below, any reference to methods or materials is understood as a reference to each of those methods or materials disjunctively (e.g., "Illustrative embodiment 1-4 is understood as illustrative embodiment 1, 2, 3, or 4.").

Illustrative embodiment 1 is a method comprising: introducing a treatment fluid comprising a cationic polymeric quaternary amine or a polyethyleneimine polymer into a treatment area of a wellbore comprising metal cations and sulfide anions, and contacting the metal cations and the sulfide anions with the treatment fluid to reduce or prevent formation of metal sulfide particles in the treatment area.

Illustrative embodiment 2 is the method of any preceding or subsequent illustrative embodiment, wherein the cationic polymeric quaternary amine comprises poly(methacrylamido-4,4,8,8-tetramethyl-4,8-diaza-6-hydroxylnonamethylene dichloride), poly(vinylbenzyl trimethyl ammonium chloride), or polydimethyldiallyl ammonium chloride.

Illustrative embodiment 3 is the method of any preceding or subsequent illustrative embodiment, wherein the metal cations comprise at least one of iron cations, lead cations, or zinc cations.

Illustrative embodiment 4 is the method of any preceding or subsequent illustrative embodiment, wherein the treatment area is a permeable subterranean formation.

Illustrative embodiment 5 is the method of any preceding or subsequent illustrative embodiment, wherein the treatment area is a downhole tubing and liner.

Illustrative embodiment 6 is the method of any preceding or subsequent illustrative embodiment, wherein the treatment fluid prevents or reduces formation of metal sulfide scaling deposit in the treatment area.

Illustrative embodiment 7 is the method of any preceding or subsequent illustrative embodiment, wherein the treatment fluid further comprises water or brine.

Illustrative embodiment 8 is the method of any preceding or subsequent illustrative embodiment, wherein the treatment fluid comprises at least 60 weight percent water or brine.

Illustrative embodiment 9 is the method of any preceding or subsequent illustrative embodiment, wherein the treatment fluid comprises up to 40 weight percent cationic polymeric quaternary amine or polyethyleneimine polymer.

Illustrative embodiment 10 is the method of any preceding or subsequent illustrative embodiment, wherein the cationic polymeric quaternary amine has an average molecular weight of from 1000 Daltons to 5,000,000 Daltons.

Illustrative embodiment 11 is the method of any preceding or subsequent illustrative embodiment, wherein the cationic polymeric quaternary amine has an average molecular weight of from 1000 Daltons to 500,000 Daltons.

Illustrative embodiment 12 is the method of any preceding or subsequent illustrative embodiment, wherein the polyethyleneimine polymer has an average molecular weight of from 1000 to 5,000,000 Daltons.

Illustrative embodiment 13 is the method of any preceding or subsequent illustrative embodiment, further comprising contacting the treatment fluid with a drilling fluid before introducing the treatment fluid into the treatment area.

Illustrative embodiment 14 is the method of any preceding or subsequent illustrative embodiment, wherein the treatment fluid is introduced to the treatment area at a concentration of from 0.0001 weight percent to 5 weight percent polymer or amine.

Illustrative embodiment 15 is the method of any preceding or subsequent illustrative embodiment, further comprising circulating the treatment fluid in the treatment area.

Illustrative embodiment 16 is the method of any preceding or subsequent illustrative embodiment, wherein the cationic polymeric quaternary amine is a homopolymer.

Illustrative embodiment 17 is a treatment fluid comprising a cationic polymeric quaternary amine or a polyethyleneimine polymer and water or brine, the treatment fluid being injectable into a wellbore comprising metal cations and sulfide anions to contact the metal cations and the sulfide anions to reduce or prevent formation of metal sulfide particles in the wellbore.

Illustrative embodiment 18 is the treatment fluid of any preceding or subsequent illustrative embodiment, wherein the metal cations comprise at least one of iron cations, lead cations, or zinc cations.

Illustrative embodiment 19 is the treatment fluid of any preceding or subsequent illustrative embodiment, wherein the cationic polymeric quaternary amine comprises poly(methacrylamido-4,4,8,8-tetramethyl-4,8-diaza-6-hydroxyl-nonamethylene dichloride), poly(vinylbenzyl trimethyl ammonium chloride), or polydimethyldiallyl ammonium chloride.

Illustrative embodiment 20 is the treatment fluid of any preceding illustrative embodiment, wherein the cationic polymeric quaternary amine has an average molecular weight of from 1000 Daltons to 500,000 Daltons.

Definitions and Descriptions

The terms "disclosure," "the disclosure," "the present disclosure," "embodiment," "certain embodiment" and the like are used herein are intended to refer broadly to all the subject matter of this patent application and the claims below. Statements containing these terms should be understood not to limit the subject matter described herein or to limit the meaning or scope of the patent claims below. The terms "comprising," "having," "including," and "containing" are to be construed as open-ended terms (i.e., meaning "including, but not limited to") unless otherwise noted. It is further noted that, as used in this specification, the singular forms "a," "an," and "the" include plural referents unless expressly and unequivocally limited to one referent.

Various embodiments of the present disclosure have been described herein. It should be recognized that these embodiments are merely illustrative of the present disclosure. Variations of those preferred embodiments may become apparent to those of ordinary skill in the art upon reading the foregoing description. The inventors expect skilled artisans to employ such variations as appropriate, and the inventors intend for the present disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated or otherwise clearly contradicted by context.

What is claimed is:

1. A method comprising:
    introducing a treatment fluid comprising 11 weight percent to 40 weight percent polyethyleneimine and 60 weight percent to 89 weight percent water, brine, or a hydrocarbon fluid into a treatment area of a wellbore comprising metal cations and sulfide anions; and
    contacting the metal cations and the sulfide anions with the polyethyleneimine in the treatment fluid to reduce or prevent formation of metal sulfide particles in the treatment area.

2. The method of claim 1, wherein the metal cations comprise at least one of iron cations, lead cations, or zinc cations.

3. The method of claim 1, wherein the treatment area is a permeable subterranean formation.

4. The method of claim 1, wherein the treatment area is a downhole tubing and liner.

5. The method of claim 1, wherein the treatment fluid prevents or reduces formation of metal sulfide scaling deposit in the treatment area.

6. The method of claim 1, wherein the treatment fluid comprises water or brine.

7. The method of claim 6, wherein the treatment fluid comprises 60 weight percent to 80 weight percent water or brine.

8. The method of claim 1, wherein the treatment fluid comprises 20 weight percent to 40 weight percent polyethyleneimine.

9. The method of claim 1, wherein the treatment fluid consists essentially of 11 weight percent to 40 weight percent polyethyleneimine and a balance of water.

10. The method of claim 1, wherein the polyethyleneimine has an average molecular weight of from 1000 to 5,000,000 Daltons.

11. The method of claim 1, further comprising mixing the treatment fluid with a drilling fluid before introducing the treatment fluid into the treatment area.

12. The method of claim 11, wherein the treatment fluid mixed with the drilling fluid is introduced to the treatment area at a concentration of from 12 weight percent to 30 weight percent polyethyleneimine.

13. The method of claim 1, further comprising circulating the treatment fluid in the treatment area.

14. A method comprising:
introducing a treatment fluid comprising a drilling fluid and a composition comprising polyethyleneimine into a treatment area of a wellbore comprising metal cations and sulfide anions, wherein the polyethyleneimine is present in the composition as a semi-solid or solid composition form, and wherein the treatment fluid comprises 11 weight percent to 40 weight percent polyethyleneimine; and
contacting the metal cations and the sulfide anions with the polyethyleneimine in the treatment fluid to reduce or prevent formation of metal sulfide particles in the treatment area.

15. The method of claim 14, wherein the polyethyleneimine is concentrated up to 95 weight percent in the composition.

16. The method of claim 14, wherein the drilling fluid comprises water, brine, or a hydrocarbon fluid.

17. A method comprising:
introducing a treatment fluid consisting essentially of 11 weight percent to 40 weight percent polyethyleneimine and 60 weight percent to 89 weight percent water into a treatment area of a wellbore comprising metal cations and sulfide anions; and
contacting the metal cations and the sulfide anions with the polyethyleneimine in the treatment fluid to reduce or prevent formation of metal sulfide particles in the treatment area.

18. The method of claim 17, wherein the treatment fluid consists essentially of 20 weight percent to 40 weight percent polyethyleneimine and 60 weight percent to 80 weight percent water.

19. The method of claim 17, further comprising mixing the treatment fluid with a drilling fluid before introducing the treatment fluid into the treatment area.

20. The method of claim 19, wherein the treatment fluid mixed with the drilling fluid is introduced to the treatment area at a concentration of from 12 weight percent to 30 weight percent polyethyleneimine.

* * * * *